(12) United States Patent
Sakemi et al.

(10) Patent No.: US 9,760,717 B2
(45) Date of Patent: Sep. 12, 2017

(54) COMMUNICATION DEVICE, SYSTEM, AND CONTROL METHOD

(71) Applicant: FUJITSU LIMITED, Kawasaki-shi, Kanagawa (JP)

(72) Inventors: Yumi Sakemi, Kawasaki (JP); Tetsuya Izu, London (GB); Yoshinobu Shimokawa, Itoshima (JP); Tadashige Iwao, Shanghai (CN)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 14/459,387

(22) Filed: Aug. 14, 2014

(65) Prior Publication Data

US 2014/0351950 A1 Nov. 27, 2014

Related U.S. Application Data

(63) Continuation of application No. PCT/JP2012/001124, filed on Feb. 20, 2012.

(51) Int. Cl.
| | |
|---|---|
| *G06F 21/32* | (2013.01) |
| *G06F 21/60* | (2013.01) |
| *G06F 21/78* | (2013.01) |
| *G08B 21/10* | (2006.01) |
| *G06F 21/00* | (2013.01) |
| *H04W 84/00* | (2009.01) |
| *G01V 1/00* | (2006.01) |

(52) U.S. Cl.
CPC ............ *G06F 21/60* (2013.01); *G06F 21/00* (2013.01); *G06F 21/78* (2013.01); *G08B 21/10* (2013.01); *H04W 84/00* (2013.01); *G01V 1/008* (2013.01)

(58) Field of Classification Search
CPC .......... G06F 21/60; G06F 21/00; G06F 21/78; G06F 21/10; H04W 84/00; G01V 1/008
See application file for complete search history.

(56) References Cited

U.S. PATENT DOCUMENTS 5,929,753 A * 7/1999 Montague ........... B60R 25/1004
340/425.5
7,432,823 B2 * 10/2008 Soni ....................... G01D 4/002
324/110

(Continued)

FOREIGN PATENT DOCUMENTS

| JP | 2003-067866 | 3/2003 |
| JP | 2004-257965 | 9/2004 |

(Continued)

OTHER PUBLICATIONS

Written Opinion of the International Searching Authority mailed Apr. 12, 2012 in International PCT/JP2012/001124.

(Continued)

*Primary Examiner* — Sharon Lynch
(74) *Attorney, Agent, or Firm* — Staas & Halsey LLP

(57) ABSTRACT

A communication device includes a memory and a processor coupled to the memory and configured to, when a first vibration is detected in the communication device, set a certain state that protects information stored in the memory, and cancel the certain state based on receiving from another communication device a notification indicating that the other communication device detected a second vibration.

4 Claims, 12 Drawing Sheets

(56) References Cited

U.S. PATENT DOCUMENTS

| | | | | |
|---|---|---|---|---|
| 7,535,345 B2* | 5/2009 | Tanaka | | B60R 25/04 200/52 A |
| 7,693,663 B2* | 4/2010 | Friedlander | | G01V 1/008 340/690 |
| 8,289,130 B2* | 10/2012 | Nakajima | | G06F 21/552 340/5.3 |
| 8,495,256 B2* | 7/2013 | Gamble | | G11B 5/5582 710/100 |
| 8,558,662 B2* | 10/2013 | Nakajima | | G06F 21/552 340/5.3 |
| 8,930,775 B2* | 1/2015 | Notohardjono | | G06F 11/0793 714/47.2 |
| 9,154,499 B2* | 10/2015 | Stevens | | G06F 21/88 |
| 9,213,810 B2* | 12/2015 | Nakajima | | G06F 21/552 |
| 2004/0246111 A1* | 12/2004 | Oyagi | | B60R 25/1004 340/426.1 |
| 2006/0218633 A1* | 9/2006 | Suzuki | | G06F 21/78 726/20 |
| 2006/0244577 A1* | 11/2006 | Tanaka | | B60R 25/1004 340/429 |
| 2007/0075847 A1* | 4/2007 | Oyagi | | B60R 25/1004 340/426.1 |
| 2007/0086257 A1* | 4/2007 | Bernier | | G06F 21/554 365/218 |
| 2007/0103334 A1* | 5/2007 | Soni | | G01D 4/002 340/870.02 |
| 2008/0270034 A1* | 10/2008 | Friedlander | | G01V 1/008 702/15 |
| 2008/0301820 A1* | 12/2008 | Stevens | | H04L 63/0846 726/28 |
| 2009/0270126 A1* | 10/2009 | Liu | | G06F 21/88 455/558 |
| 2010/0058077 A1 | 3/2010 | Matsuda et al. | | |
| 2010/0207721 A1* | 8/2010 | Nakajima | | G06F 21/552 340/5.3 |
| 2011/0121965 A1* | 5/2011 | Betts | | G08B 13/1427 340/539.13 |
| 2012/0039117 A1* | 2/2012 | Webb | | G11C 13/0004 365/163 |
| 2012/0182641 A1* | 7/2012 | Gamble | | G11B 5/5582 360/75 |
| 2013/0057404 A1* | 3/2013 | Thibault | | G08B 29/22 340/545.1 |
| 2013/0065608 A1* | 3/2013 | Nakajima | | G06F 21/552 455/456.1 |
| 2013/0138992 A1* | 5/2013 | Notohardjono | | G06F 11/0793 714/1 |
| 2014/0090050 A1* | 3/2014 | Nakajima | | G06F 21/552 726/16 |
| 2016/0154950 A1* | 6/2016 | Nakajima | | G06F 21/552 726/19 |

FOREIGN PATENT DOCUMENTS

| | | |
|---|---|---|
| JP | 2006-065590 | 3/2006 |
| JP | 2006-350505 | 12/2006 |
| JP | 2007-128398 | 5/2007 |
| JP | 2010-219752 | 9/2010 |
| JP | 2011-030054 | 2/2011 |
| JP | 2011-044037 | 3/2011 |
| WO | WO2008/117467 A1 | 10/2008 |

OTHER PUBLICATIONS

Japanese Office Action mailed Feb. 16, 2016 in related Japanese Application No. 2014-500548.
International Search report mailed Apr. 17, 2012 in corresponding International application PCT/JP2012/001124.

* cited by examiner

FIG. 5A

50 { LOCAL SOURCE ADDRESS | LOCAL DESTINATION ADDRESS | GLOBAL SOURCE ADDRESS | GLOBAL DESTINATION ADDRESS | COMMUNICATION DEVICE ID }51 | STATE FLAG | TIME INFORMATION

FIG. 5B

52 { LOCAL SOURCE ADDRESS | LOCAL DESTINATION ADDRESS | PACKET TYPE | GLOBAL SOURCE ADDRESS | GLOBAL DESTINATION ADDRESS | COMMUNICATION DEVICE ID }53 | TIME INFORMATION

FIG. 7

| SYNC NODE ID | AREA ID |
|---|---|
| SN1 | A |
| SN2 | B |
| SN3 | C |
| SN4 | D |

| LOCAL SOURCE ADDRESS | LOCAL DESTINATION ADDRESS | GLOBAL SOURCE ADDRESS | GLOBAL DESTINATION ADDRESS | COMMUNICATION DEVICE ID | STATE FLAG | TIME INFORMATION |

80 { LOCAL SOURCE ADDRESS ... GLOBAL DESTINATION ADDRESS }
81 { COMMUNICATION DEVICE ID, STATE FLAG, TIME INFORMATION }

FIG. 8B

| LOCAL SOURCE ADDRESS | LOCAL DESTINATION ADDRESS | GLOBAL SOURCE ADDRESS | GLOBAL DESTINATION ADDRESS | SYNC NODE ID | STATE FLAG | TIME INFORMATION |

82 { LOCAL SOURCE ADDRESS ... GLOBAL DESTINATION ADDRESS }
83 { SYNC NODE ID, STATE FLAG, TIME INFORMATION }

FIG. 8C

| LOCAL SOURCE ADDRESS | LOCAL DESTINATION ADDRESS | PACKET TYPE | GLOBAL SOURCE ADDRESS | GLOBAL DESTINATION ADDRESS | COMMUNICATION DEVICE ID | TIME INFORMATION |

84 { LOCAL SOURCE ADDRESS ... GLOBAL DESTINATION ADDRESS }
85 { COMMUNICATION DEVICE ID, TIME INFORMATION } even between nodes that do not exist within communication range of each other, via another node or nodes that exist within the communication ranges of the respective nodes.

COMMUNICATION DEVICE, SYSTEM, AND CONTROL METHOD

CROSS-REFERENCE TO RELATED APPLICATION

This application is a continuation application of International Application PCT/JP2012/001124 filed on Feb. 20, 2012, the entire contents of which are incorporated herein by reference.

FIELD

The technology disclosed in this specification relates to security technology for information included in a communication device.

BACKGROUND

An ad hoc network is a type of self-organizing network linked by wired or wireless communication. An ad hoc network is made up of multiple devices having communication functionality. Herein, a device having communication functionality in an ad hoc network will be called a node. Also, each node within an ad hoc network transmits and receives packets by multi-hop communication. Multi-hop communication is a technology that enables communication even between nodes that do not exist within communication range of each other, via another node or nodes that exist within the communication ranges of the respective nodes.

One example of a system utilizing an ad hoc network is a metering system that, by building a node capable of wireless communication into the power meters of respective homes, collects information such as the amount of power consumed by each home via the ad hoc network. In the metering system, a packet that includes the amount of power consumed by each home as detected by each electricity meter are forwarded from each node provided in the electricity meter of each home to an electric power company system. Each node in such a metering system stores personal information related to the power usage of each home in each node's own storage area.

Additionally, from the perspective of anonymity, anti-tampering, and the like, there is demand to conduct secure communication utilizing an ad hoc network. As one example of secure communication, a technique such as encrypting some or all packets for forwarding may be used. In order to conduct secure communication, each node stores information, such as an encryption key for encrypting personal information, in each node's own storage area.

Meanwhile, there is also technology that, when a mobile device senses a designated vibration, enables a device protection function that disables operations other than a designated unlock operation. Additionally, if a legitimate user inputs the unlock operation, the technology disables the device protection function. Such a mobile device is disclosed in Japanese Laid-open Patent Publication No. 2011-30054, for example.

SUMMARY

According to an aspect of the invention, a communication device includes a memory and a processor coupled to the memory and configured to, when a first vibration is detected in the communication device, set a certain state that protects information stored in the memory, and cancel the state based on receiving from another communication device a notification indicating that the other communication device detected a second vibration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are exemplary data structures of a transition notification;

FIG. 7 is an exemplary data structure of a management table;

FIGS. 8A to 8C are exemplary data structures of a control command;

DESCRIPTION OF EMBODIMENT

If a node is stolen, there is a possibility that secret information stored in the storage area of that node may be leaked. Herein, secret information is personal information or information for ensuring the security the network (such as an encryption key, for example).

Accordingly, it is conceivable to reuse technology of the related art related to mobile devices, so that if a node senses a designated vibration, a function for deterring the leakage of secret information is enabled, thereby deterring the leakage of secret information by theft. For example, the function for deterring the leakage of secret information may conceivably be a function that deletes secret information after a designated amount of time elapses since sensing a designated vibration.

At this point, an acceleration sensor is often used in order to sense vibration, but an acceleration sensor may sometimes also sense vibrations caused by factors other than theft. It is not suitable to enable the function for deterring the leakage of secret information in response to a variety of vibrations, including vibrations caused by factors other than theft.

According to the technology disclosed in the present embodiment, even if a node enables a function for deterring the leakage of secret information, the function is cancelled in the case of vibration that does not warrant the function.

Hereinafter, an exemplary embodiment of a communication device, a communication method, and a system according to the present disclosure will be described in detail and with reference to the attached drawings.

Example 1

[Network System]

Figure 1:
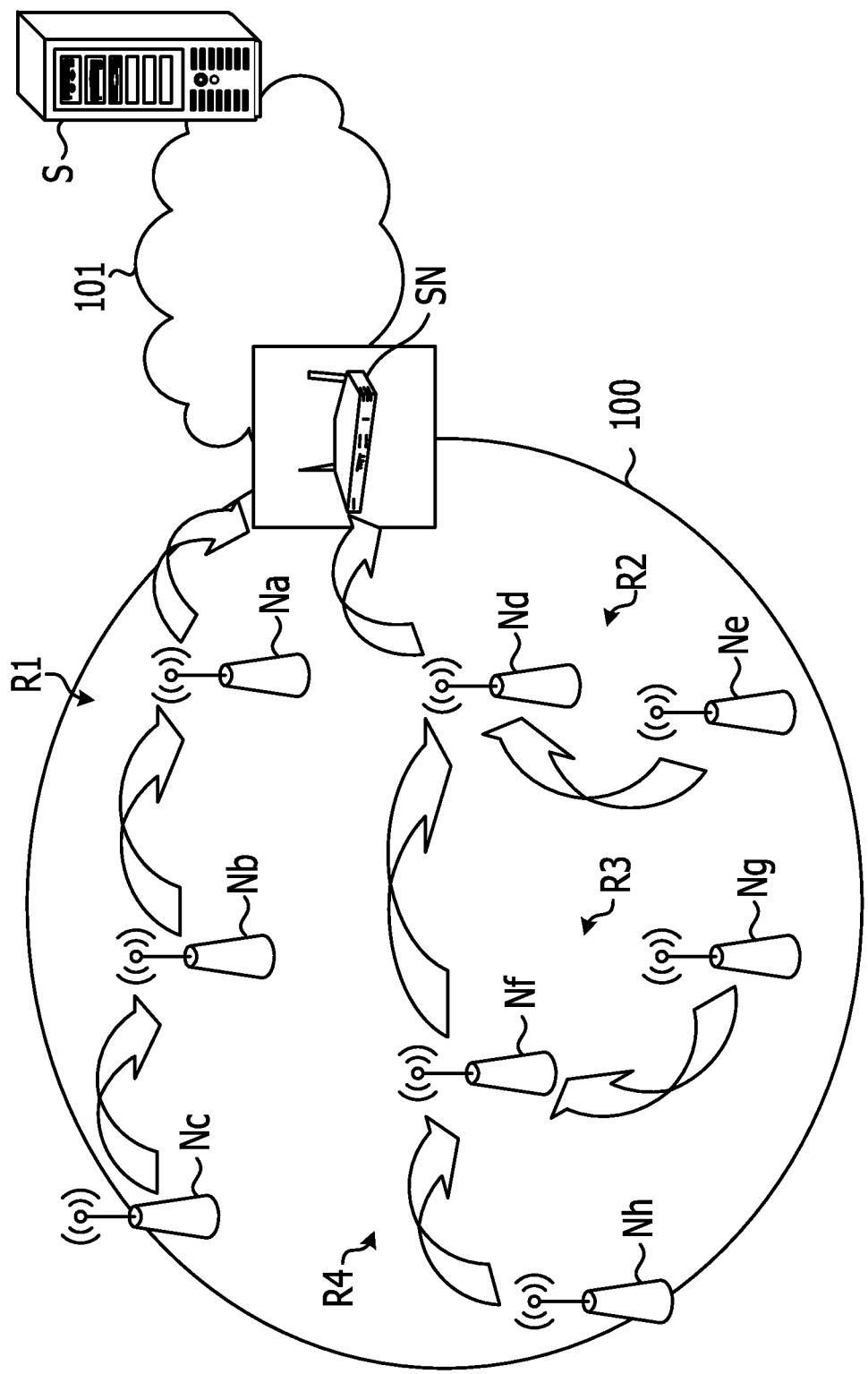
FIG. 1 is an explanatory diagram illustrating a working example of a network system according to an exemplary embodiment.

FIG. 1 is an explanatory diagram illustrating a working example of a network system according to an exemplary embodiment. The network system includes multiple communication devices and a management device. Note that FIG. 1 illustrates a system constituting an ad hoc network as an example of a network system according to the present embodiment. First, FIG. 1 will be used to describe the ad hoc network, as well as ordinary packet forwarding in the ad hoc network.

The ad hoc network system includes a management server S, a sync node SN, and nodes Na to Nh. Note that the nodes Na to Nh are examples of a communication device. Meanwhile, at least one of the management server S and the sync node SN are examples of a management device.

The management server S and the sync node SN are connected via an ordinary network 101 such as the Internet, a LAN, or a WAN. The sync node SN is connected to the nodes Na to Nh via an ad hoc network 100.

The sync node SN is a bridge device that connects the ad hoc network 100 and the ordinary network 101. The sync node SN is able to transmit and receive both information in the format of the protocol of the ad hoc network 100 and information in the format of the protocol of the ordinary network 101.

In addition, the sync node SN forwards communication by performing protocol conversion on information between the ad hoc network 100 and the ordinary network 101. For example, packets transmitted from each node within the ad hoc network 100 and addressed to the management server S are subjected to protocol conversion at the sync node SN. After that, the sync node SN forwards the packets to the ordinary network 101, and thus each packet reaches the management server S.

Also, data transmitted from the management server S or the sync node SN and addressed to respective nodes is subjected to protocol conversion at the sync node SN, and forwarded as packets from the sync node SN to each node within the ad hoc network 100.

Note that the sync node SN uses a routing table to ascertain whether or not communication with each node is available. Subsequently, the sync node SN, based on information in the routing table, autonomously generates a packet forwarding route. For each node, a forwarding source and a forwarding destination are configured in the case of conducting multi-hop communication according to the routing of the sync node SN. Note that the forwarding source is a node itself, while the forwarding destination is another node.

Additionally, each node may also generate a routing table individually. Each node exchanges information related to current communication conditions with nearby nodes. Each node then generates a routing table based on the information related to the communication conditions. For example, even in the case in which one node becomes unable to communicate and communication becomes unavailable partway along a route, it becomes possible to configure a forwarding route that takes this information into account.

Multiple nodes are provided within the ad hoc network 100. FIG. 1 illustrates the nodes Na to Nh as a representative example.

Each node is a device capable of multi-hop communication with other nodes available for communication within a designated communication range. In the ad hoc network 100, not all nodes Na to Nh may be able to communicate with the sync node SN directly, but each node Na to Nh communicates with the sync node SN by traversing other nodes.

For this reason, on the ad hoc network 100, it is sufficient for some nodes to be able to communicate with the sync node SN. In FIG. 1, the nodes capable of direction communication with the sync node SN are assumed to be the nodes Na and Nd.

The network system according to the present working example is applied to a system that collects power usage amounts for respective homes, for example. In the case of such a system, each node is installed in a power meter for each home that detects the power usage amount of each home. The power usage amount detected by each node is transmitted to the management server S, thereby enabling the management server S to collect power usage amounts for the respective homes.

Specifically, suppose that the respective nodes are built into the power meter of each home, for example. Each node transmits the power usage amount of each home detected by each node to the management server S via the ad hoc network 100.

Note that the power usage amount of each home may be measured by each node, or acquired by each node from a power meter. Also, each node stores a detected power usage amount in the node's own storage area. The sync node SN transmits the power usage amount of each home received from each node within the ad hoc network 100 to the management server S of a power company via the ordinary network 101. Consequently, power usage amounts may be collected without dispatching workers locally.

Also, in a network system of the present embodiment, an encryption key is used to encrypt packets. Note that furthermore a message authentication code (MAC) may be generated and attached to each packet. In the case of generating a MAC, a key for MAC generation is used. Consequently, secure communication on the ad hoc network 100 is ensured. Note that the encryption key and the key for MAC generation are stored in the storage area of each node.

Note that although the example of FIG. 1 is configured such that a single sync node SN is provided within the ad hoc network 100, it may also be configured such that multiple sync nodes SN are provided within one ad hoc network 100.

Also, although there is one ad hoc network 100 in FIG. 1, there may be multiple ad hoc networks in some cases. In the case of multiple ad hoc networks, at least one sync node is included in each of the multiple ad hoc networks, and the management server S is connected to those sync nodes via an ordinary network. According to this configuration, data may be transmitted and received between the management server S and all nodes.

In addition, this network system may not only collect power usage amounts, but also be used for environmental surveying or the like by equipping each node with sensor functions that sense temperature, humidity, and illumination, for example.

In FIG. 1, suppose that four routes R1 to R4 are configured by the nodes Na to Nh constituting the ad hoc network 100. Specifically, the route R1 is a route that includes the node Nc, the node Nb, the node Na, and the sync node SN. The route R2 is a route that includes the node Ne, the node Nd, and the sync node SN. The route R3 is a route that includes the node Ng, the node Nf, the node Nd, and the sync node SN. The route R4 is a route that includes the node Nh, the node Nf, the node Nd, and the sync node SN. Note that the node Na and the node Nd are the nodes that directly communicate with the sync node.

A node close to the sync node SN will be called an upstream node. Note that, depending on the scale of the ad hoc network 100, the node Nb and the node Ne may also become upstream nodes. In the case in which data is transmitted from each of the nodes Na to Nh to the management server S, each node Na to Nh transmits respectively detected data to the sync node SN by following the routed routes R1 to R4.

Figure 2:
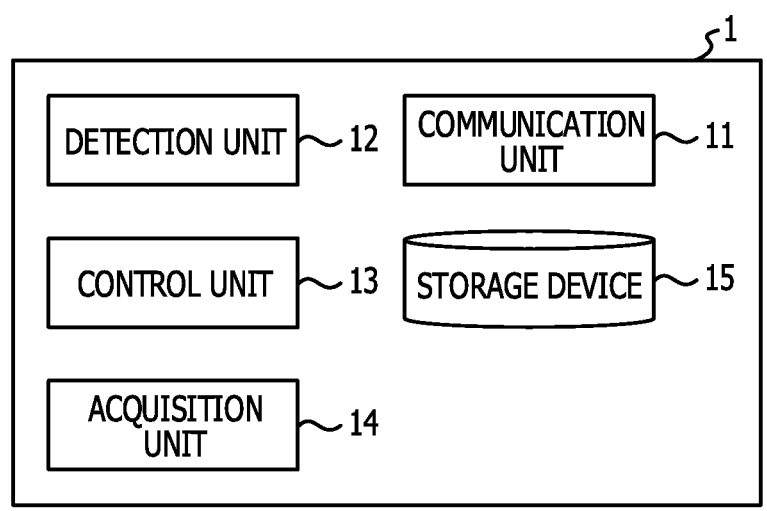
FIG. 2 is a function block diagram of a communication device.

Next, a functional configuration of a communication device will be described. Note that the nodes N in FIG. 1 will be described as the following communication device. FIG. 2 is a function block diagram of a communication device.

The communication device 1 includes a communication unit 11, a detection unit 12, a control unit 13, an acquisition unit 14, and a storage device 15. The communication unit 11 is a processing unit that communicates with another communication device. For example, the communication unit 11 exchanges packets with another communication device. Also, the communication unit 11 in some communication devices 1 communicates with the sync node SN of FIG. 1. For example, the communication unit 11 directly or indirectly receives a control command to be discussed later from a management device.

The detection unit 12 is a processing unit that detects vibration of the communication device 1. For example, the detection unit 12 senses vibration by receiving output from an acceleration sensor provided in the communication device 1. Note that it may be configured so that vibration is detected when the output from the acceleration sensor is equal to or greater than a designated value.

The control unit 13 is a processing unit that controls the state of the communication device 1. For example, when the detection unit 12 senses vibration, the communication device 1 may transition to a state for protecting secret information stored by the storage device 15. In addition, in the case of receiving a control command from a management server, the control unit 13 cancels the state for protecting secret information stored by the storage device 15. The control command will be later discussed in detail.

The state for protecting secret information stored by the storage device 15 is designated the alert state. Note that the alert state refers to a state in which some kind of countermeasure is engaged in order to deter the leakage of secret information stored by the storage device 15.

Examples of the alert state include a state of engaging a countermeasure that configures higher security with respect to accessing the storage device than an ordinary state. Another example is a state that monitors the elapsed time since sensing vibration. In this case, the leakage of secret information is deterred by deleting secret information when the elapsed time since sensing vibration becomes equal to or greater than a designated threshold value.

Hereinafter, the alert state will be described as a state in which the control unit 13 monitors the elapsed time since sensing vibration. In other words, the control unit 13 starts monitoring the elapsed time if the detection unit 12 senses vibration. Subsequently, the control unit 13 deletes secret information after a designated amount of time elapses. On the other hand, if a control command is received before the designated amount of time elapses, the control unit 13 cancels the alert state by aborting the monitoring of the elapsed time. In other words, since the measurement of the elapsed time is stopped, secret information is not deleted.

The acquisition unit 14 acquires an output value from a sensor or device included in the communication device 1, or from an external sensor or device. The acquisition unit 14 then stores the output value in the storage device 15.

The storage device 15 is a storage device that stores output values. Note that at least some output values are treated as secret information. In addition, the storage device 15 is a storage device that stores security-related information such as an encryption key.

Figure 3:
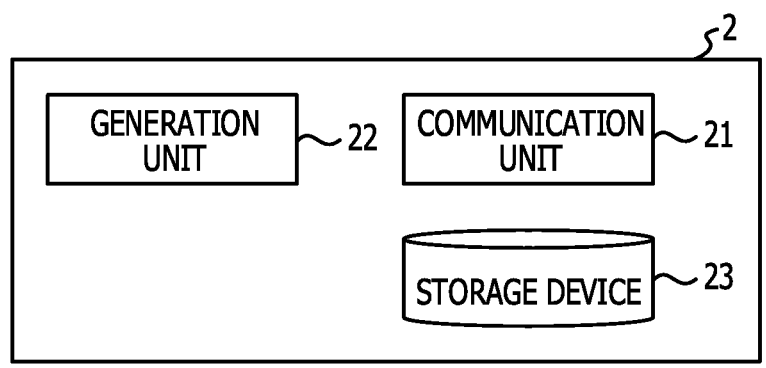
FIG. 3 is a function block diagram of a management device.

Next, the management device will be described. The management device is either the sync node SN or the management server S in FIG. 1. FIG. 3 is a function block diagram of a management device.

The management device 2 includes a communication unit 21, a generation unit 22, and a storage device 23. The communication unit 21 directly or indirectly communicates with a communication device 1. For example, the communication unit 21 outputs a control command. For example, if the management device 2 is the sync node SN, the management device 2 transmits a control command to an upstream communication device. On the other hand, if the management device 2 is the management server, the management device 2 transmits a control command to each communication device via the sync node SN.

Subsequently, the control command is forwarded from an upstream communication device to a downstream communication device. Note that when a control command is transmitted from an upstream communication device to a downstream communication device, a packet related to the control command may be broadcast, without following a routing.

The generation unit 22 is a processing unit that generates a control command. The control command is a signal that instructs each communication device to cancel the alert state. Also, the control command is a signal that causes each communication device to cancel the alert state, or a signal that stops each communication device from transitioning to the alert state.

The generation unit 22 may also generate, together with a control command, identification information designating a communication device to receive the control command. The identification information may be an device ID or address of each communication device. The identification information may also be information identifying a network. For example, if the management device 2 is the management device, the sync node SN may be designated, thereby designating the network managed by the designated sync node SN. A control command is transmitted to multiple communication devices included in each network. On the other hand, if the management device 2 is the sync node SN, each communication device under the supervision of the sync node SN receives a control command, even in a state of no identification information.

Figure 4:
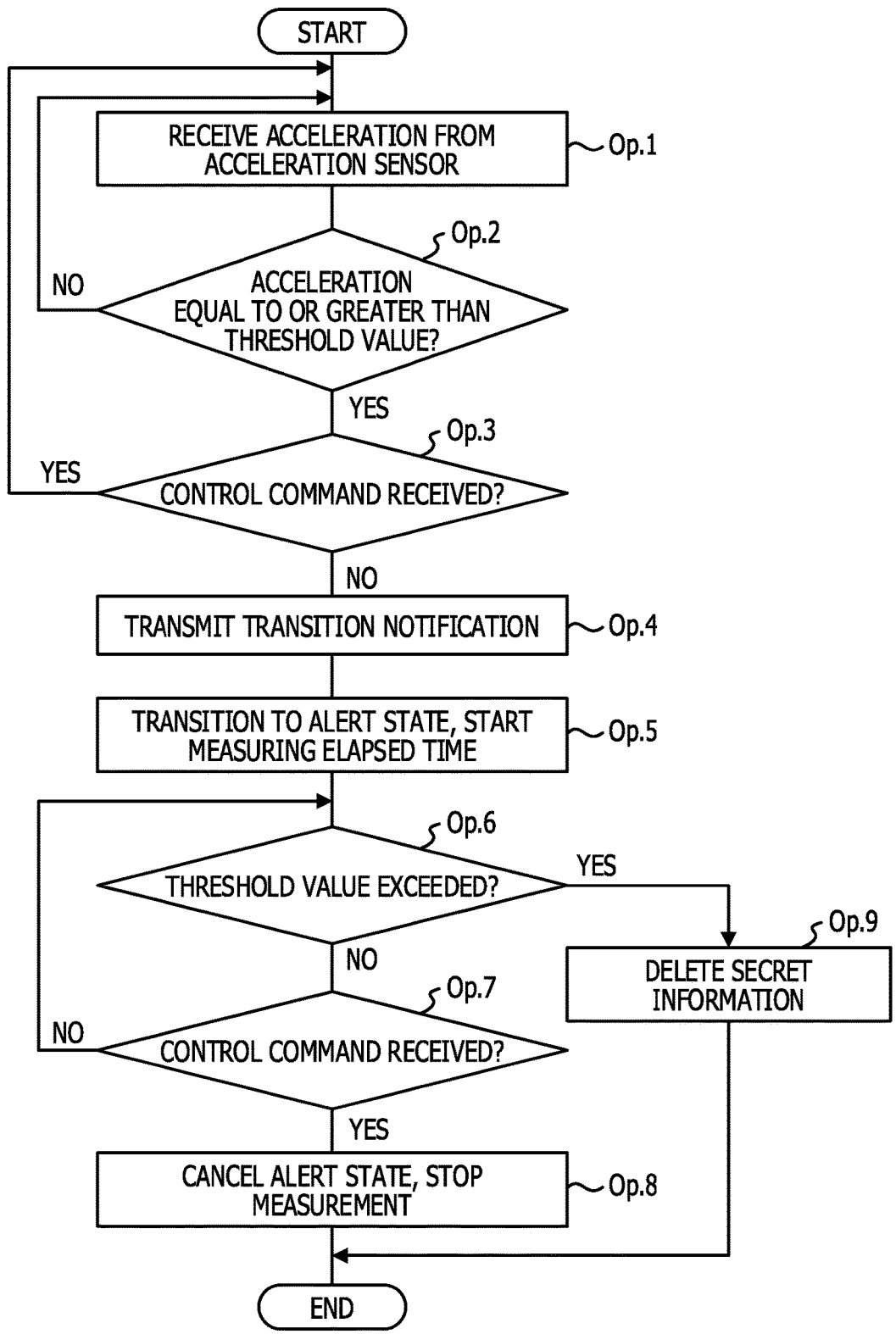
FIG. 4 is a flowchart of a process executed by the communication device 1 in Example 1.

Next, a process of the communication device 1 will be described. FIG. 4 is a flowchart of a process executed by the communication device 1 in Example 1.

From an acceleration sensor, the detection unit 12 receives an acceleration detected by the acceleration sensor (Op. 1). The detection unit 12 determines whether or not the received acceleration is equal to or greater than a threshold value (Op. 2). Note that Op. 2 is a process intended to sense vibration with a likelihood of theft. Accordingly, a value of acceleration from which the likelihood of theft may be inferred is configured as the threshold value.

If the acceleration is equal to or greater than the threshold value, it is determined that shaking equal to or greater than the threshold value has occurred in the communication device 1. In other words, it is judged that theft of the communication device 1 is likely. If the acceleration is equal to or greater than the threshold value (Op. 2, Yes), the communication device 1 advances the process to Op. 3. On the other hand, if the acceleration is less than the threshold value (Op. 2, No), the communication device 1 returns to Op. 1.

Next, it is determined whether or not a control command from the management device 2 has been received (Op. 3). A control command is generated by the management device 2 according to a process discussed later. Note that the control command is a command that cancels the alert state, or a command that stops a transition to the alert state.

In the case of not receiving a control command (Op. 3, No), the control unit 13 transmits a transition notification with the management device 2 as the final destination, based on a route routed in advance (Op. 4). Note that the transition notification may also be encrypted for transmission. In the case of receiving a control command (Op. 3, Yes), the process returns to Op. 1. In other words, the communication device 1 does not transition to the alert state.

At this point, the transition notification will be described. The transition notification is a packet for informing another device that a communication device has sensed vibration equal to or greater than a threshold value. Exemplary data structures of a transition notification will be described. FIGS. 5A and 5B are exemplary data structures of a transition notification.

Note that FIGS. 5A and 5B are an example of adopting a structure similar to an ordinary packet for a transition notification. An ordinary packet refers to a packet in the case of multi-hop forwarding of information detected by each communication device. An ordinary packet includes a header and a body. The header includes information related to forwarding, while the body includes detected information. However, a transition notification may also have a predetermined structure, and not a structure similar to an ordinary packet.

FIG. 5A is a first exemplary data structure of a transition notification. The transition notification includes a header 50 and a body 51. The header 50 includes a local destination source address, a local destination address, a global source address, and a global destination address.

The local source address is the address of the communication device from which a packet is forwarded on one hop in the case of forwarding the packet by multi-hop forwarding. In other words, the local source address included in the transition notification is the address of the communication device that forwards the transition notification.

Next, the local destination address is the address of the communication device to which a packet is forwarded on the one hop. In other words, the local destination address included in the transition notification is the address of a communication device designated as the forwarding destination of the transition notification. As above, the local source address and the local destination address are overwritten at each communication device for each forwarding hop.

The global source address is the address of the communication device at the start point of the multi-hop forwarding in the case of forwarding the packet by multi-hop forwarding. In other words, the global source address included in the transition notification is the address of the communication device that sensed vibration.

The global destination address is the address of the device at the end point of the multi-hop forwarding in the case of forwarding the packet by multi-hop forwarding. In other words, the global destination address included in the transition notification is the address of the management device. The global source address and the global destination address are not overwritten.

Additionally, the body 51 includes a communication device ID, a state flag, and time information. The communication device ID is information that identifies a communication device. In other words, the communication device ID included in the transition notification is the communication device ID of the communication device that sensed vibration.

The state flag is information that expresses the state of the communication device having the communication device ID. The state flag included in the transition notification is a flag indicating that the communication device is in the alert state. For example, a "1" indicating that the communication device is in the alert state is configured. The time information is information related to the time when the communication device having the communication device ID sensed vibration.

Meanwhile, FIG. 5B is a second exemplary data structure of a transition notification. The transition notification includes a header 52 and a body 53. Similarly to the first transition notification, the header 52 includes a local destination source address, a local destination address, a global source address, and a global destination address. In addition, the header 52 also includes information on the packet type.

The packet type is information indicating that the current packet is a transition notification. For example, "9" is configured. By referencing the header 52, each communication device and the management device are able to distinguish the current packet as a transition notification.

Similarly to the first transition notification, the body 53 includes a communication device ID and time information. However, the state flag may also not be included.

Returning to the description of the process, subsequently, the control unit 13 transitions from an ordinary state to an alert state (Op. 5). In the present working example, transitioning to the alert state means starting to measure the elapsed time. For example, the control unit 13 starts a count of a timer, after first resetting the timer. Note that Op. 4 and Op. 5 may also be reversed in order.

The control unit 13 determines whether or not the elapsed time has exceeded a threshold value (Op. 6). The threshold value is configured in advance by an administrator. Furthermore, for the threshold value, it is conceivable to configure a value that is greater than the time elapsing between the management device 2 generating a control command and a communication device 1 receiving the control command, but not long enough to allow the acquisition of secret information.

If the elapsed time exceeds the threshold value (Op. 6, Yes), the control unit 13 deletes at least some of the secret information being stored in the storage device (Op. 9). Note that the control unit 13 may also delete all information being stored in the storage device, without discriminating among the secret information.

If the elapsed time has not exceeded the threshold value (Op. 6, No), the control unit 13 determines whether or not the communication unit 11 has received a control command (Op. 7). The control command will be discussed later. Note that the communication unit 11 receives a control command from another communication device, the sync node, or the management device.

If a control command has not been received (Op. 7, No), the control unit 13 returns to Op. 6. On the other hand, if a control command has been received (Op. 7, Yes), the alert state is cancelled (Op. 8). In the present working example, cancelling the alert state means stopping the measurement of the elapsed time. For example, the control unit 13 stops the count up of the timer. Subsequently, the communication device 1 ends the series of processes.

Note that in the case in which the alert state is a state of heightened security against accessing secret information, the control unit 13 maintains the alert state until a control command is received. Subsequently, the control unit 13 cancels the alert state when a control command is received. Alternatively, the state of heightened security against accessing secret information may be maintained for a designated amount of time, and if a control command is not received afterwards, the secret information may be deleted.

Figure 6:
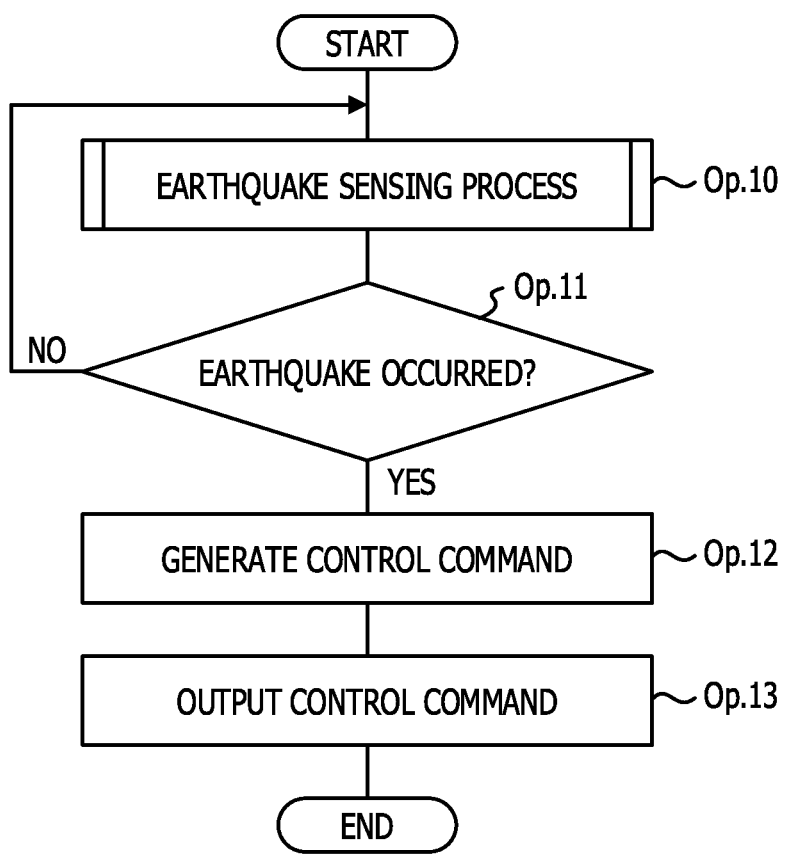
FIG. 6 is a flowchart of a process executed by the management device 2 in Example 1.

Next, a process of the management device 2 will be described. FIG. 6 is a flowchart of a process executed by the management device 2 in Example 1.

The communication unit 21 and the generation unit 22 in the management device 2 execute an earthquake sensing process (Op. 10). Multiple techniques will be described as the earthquake sensing process.

The first technique senses an earthquake by communication between the management device 2 and a disaster management device. Additionally, the first technique encompasses the case of the management device 2 querying the disaster management device for earthquake information, and the case of the disaster management device actively transmitting earthquake information to the management device 2. Note that the disaster management device is a computer that manages earthquake information. Note that the disaster management device may also be an external computer not included in the network system. Earthquake information is information that includes areas where an earthquake occurred, the scale of the earthquake (the magnitude in each area), as well as the time of occurrence or the like.

First, a method will be described for the case of the management device 2 querying the disaster management device for earthquake information according to the first technique. When the communication unit 21 of the management device 2 receives a transition notification, the generation unit 22 references a management table 70 stored in the storage device 23 included in the management device 2. Subsequently, the generation unit 22 specifies the area containing the communication device that generated the transition notification. Note that if the management device 2 is a sync node, the process of specifying an area may be omitted, since each sync node already knows the area of the network.

Subsequently, the communication unit 21 transmits to the disaster management device a request for information, including area information that identifies the relevant area. If earthquake information corresponding to the area information exists, the communication unit 21 receives that earthquake information from the disaster management device. According to the above process, the management device 2 senses that an earthquake has occurred.

Figure 7:
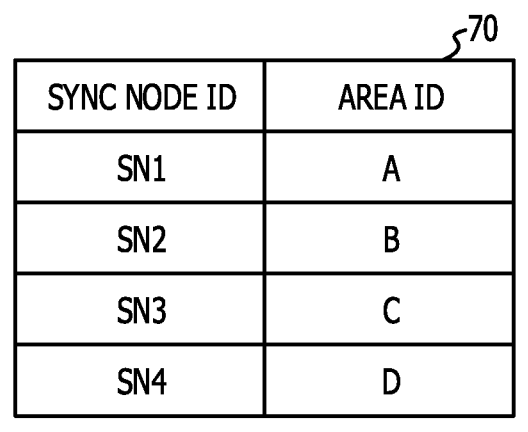

An exemplary data structure of the management table 70 will now be described. FIG. 7 is an exemplary data structure of the management table 70. Also, as discussed earlier, the management table 70 is used in the case in which the management device 2 is the management server S.

The management table 70 stores sync node IDs and area IDs in association with each other. The sync node IDs are values that uniquely identify each sync node. The area IDs are values uniquely assigned to each area. In the management table, the sync node IDs of sync nodes that aggregate packets from the communication devices in each area are stored in association with the area IDs of each area.

For example, in the example of FIG. 7, the sync node corresponding to the sync node ID "SN1" aggregates packets from communication devices existing in the area A. In addition, the sync node corresponding to the sync node ID "SN1" forwards packets from a management server to communication devices existing in the area A. In other words, the sync node corresponding to the sync node ID "SN1" transmits a transition notification from a communication device existing in the area A to the management device 2, that is, the management server S. In addition, the sync node corresponding to the sync node ID "SN1" forwards a control command from the management device 2, that is, the management server S, to a communication device existing in the area A.

For example, in the case of receiving a transition notification from a sync node with the sync node ID "SN1", the management device 2, that is, the management server S, references the management table and thereby specifies the area ID "A" as the area containing the communication device that generated the transition notification.

In addition, the management device may also be configured to convert the area ID into information such as a physical address, and include information related to the converted area in the request for information. In this case, the management device additionally includes a table for converting area IDs into physical addresses.

According to the present method, the management device 2 is able to access a disaster management device upon receiving a notification that one of multiple communication devices being managed has transitioned to an alert state. Subsequently, the management device 2 may query the disaster management device for earthquake information about a relevant area as appropriate.

Next, a method will be described for the case of the disaster management device actively transmitting earthquake information to the management device 2 according to the first technique. When an earthquake occurs, the communication unit 21 acquires earthquake information at a timing when the disaster management device delivers earthquake information. Note that it may be configured such that earthquake information is transmitted from the disaster management device to the management device when an earthquake of at least a preconfigured scale occurs. The management device 2 stores the earthquake information in the storage device 23. Note that the earthquake information may also be stored in another storage device different from the storage device 23.

Subsequently, the management device 2 determines whether or not an earthquake has occurred, based on the earthquake information stored in the storage device 23. According to the above process, the management device 2 senses that an earthquake has occurred.

According to the present method, earthquake information is autonomously transmitted from the disaster management device, and thus the management device 2 is able to sense that an earthquake has occurred in a shorter amount of time. Consequently, the management device 2 is able to further shorten the amount of time taken until a subsequent process related to generating a control command.

On the other hand, for the second technique, the management device 2 senses the occurrence of an earthquake based on transition notifications received from communication devices 1. The communication unit 21 receives a transition notification from multiple communication devices 1. Subsequently, the generation unit 22 counts the number of received transition notifications. Note that the number of transition notifications is counted per area or network.

Also, the management device 2 may count the number of received transition notifications, or identify the communication device IDs included in the transition notifications, and count the number of transition notifications excluding duplicates. Subsequently, if the number of transition notifications is equal to or greater than a designated number, the generation unit 22 senses that an earthquake has occurred in the corresponding area.

According to the present method, the management device 2 is able to sense the occurrence of an earthquake without communicating with an external device such as a disaster management device. In other words, by using transition notifications transmitted from multiple communication devices managed by the management device 2, the management device 2 is able to sense the occurrence of an earthquake.

Note that the designated number may also be configured as an individual value for each area. For example, if the communication device 1 is provided in an electricity meter, the number of participating households may differ in each ad hoc network area. Consequently, a large value may be configured for an area with a large number of participating households, whereas a small value may be configured for an area with a small number of participating households. Also, a ratio rather than an absolute number may also be configured.

As above, the management device 2 executes a process that senses the occurrence of an earthquake by various methods. In Op. 11 of FIG. 6, the generation unit 22 determines whether or not an earthquake has occurred, based on the result of the earthquake sensing process. Note that this determination may be made per area.

If an earthquake has not occurred (Op. 11, No), the generation unit 22 returns the process to Op. 10. For example, if earthquake information has not been received from the disaster management device, the generation unit 22 judges that an earthquake has not occurred. As another method, if transition notifications equal to or greater than the designated number have not been received, the generation unit 22 judges that an earthquake has not occurred. In other words, the generation unit 22 does not generate a control command.

On the other hand, if an earthquake has occurred (Op. 11, Yes), the generation unit 22 generates a control command (Op. 12). Note that the generation unit 22 may additionally encrypt the control signal.

The control command will now be described. The control command is a packet for causing a communication device to cancel an alert state, or a packet that stops the transition to the alert state in a communication device. Exemplary data structures of a control command will be described. FIGS. 8A to 8C are exemplary data structures of a control command. Note that FIGS. 8A to 8C are an example of adopting a structure similar to an ordinary packet for the control command.

FIG. 8A is a first exemplary data structure of a control command. The control command includes a header 80 and a body 81. The header 80 includes a local destination source address, a local destination address, a global source address, and a global destination address.

The local source address included in the control command is the address of the communication device that forwards the control command. The management device configures the address of the management device as the local source address.

The local destination address included in the control command is the address of a communication device designated as the forwarding destination of the control command. However, as the control command is forwarded over multiple hops, the local source address is overwritten by an address related to the communication device at the forwarding source in each hop.

The global source address included in the control command is the address of the management device. The global destination address included in the control command is the address of a communication device corresponding to a communication device ID included in the control command.

Additionally, the body 81 includes a communication device ID, a control flag, and time information. The communication device ID included in the control command is the communication device ID of a communication device to be subjected to the control command.

The control flag is information indicating that the alert state in the communication device having the communication device ID is to be cancelled. For example, a "2" that cancels the alert state is configured. Each communication device references the control flag in the body, and cancels the alert state as appropriate. The time information is information related to the time when the management device generated the control command.

FIG. 8B is a second exemplary data structure of a control command. The second control command is an example of the case in which a management server functions as the management device. The control command includes a header 82 and a body 83. The header 82 is similar to the header 80 in the first control command.

The body 83 includes a sync node ID instead of the communication device ID in the body 81 of the first control command. The sync node ID is information that designates a range over which to broadcast the control command. In other words, multiple communication devices existing under the supervision of each sync node receive the control command. The sync node ID of a specific sync node is configured in the body 83. The specific sync node refers to a sync node ID associated with an area in which an earthquake has occurred. If the management device 2 is the management server S, the sync node ID configured in the control command is decided by referencing the management table in FIG. 7.

In addition, FIG. 8C is a third exemplary data structure of a control command. The control command includes a header 84 and a body 85. Similarly to the first and second control commands, the header 84 includes a local destination source address, a local destination address, a global source address, and a global destination address. In addition, the header 84 also includes information on the packet type.

The packet type is information indicating that the current packet is a control command. For example, "8" is configured. By referencing the header 84, each communication device is able to distinguish that the current packet is a control command.

In addition, the body 85 includes a communication device ID and time information. Note that the third control command may also include a sync node ID instead of the communication device ID illustrated in FIG. 8C.

Subsequently, the communication unit 21 outputs the control command (Op. 13). If the management device 2 is a sync node, the communication unit 21 transmits the control command to at least some of the communication devices. On the other hand, if the management device 2 is a management server, the communication unit 21 transmits the control command to a sync node. Subsequently, the management device 2 ends the series of processes.

According to the above processes, a communication device 1 is able to transition to an alert state in the case of sensing a likelihood of theft. In other words, the possibility of secret information being acquired by a thief may be reduced. Also, if the vibration in the case of judging a likelihood of theft is not vibration caused by theft, the communication device is able to autonomously return to an ordinary state. For example, the deletion of secret information may be avoided in cases in which theft does not occur.

By having a processor of a communication device statistically process output from an acceleration sensor, the communication device 1 is able to cancel the alert state when the alert state is inappropriate, without distinguishing whether or not vibration detected by the acceleration sensor is vibration caused by theft. Furthermore, even in the case in which the acceleration sensor is not a sensor with advanced processing power, according to a communication device disclosed herein, the alert state may be cancelled when the alert state is inappropriate.

For example, with a simple acceleration sensor, distinguishing between shaking caused by an earthquake and shaking caused by theft may be difficult. Consequently, uniformly maintaining an alert state as a result of sensing a designated vibration is not suitable. For example, deleting secret information is inappropriate if the vibration is vibration caused by an earthquake. According to the present working example, even if a communication device transitions to an alert state due to vibration caused by an earthquake, the alert state may be cancelled.

In addition, a management device 2 is able to transmit a control command to a communication device 1 when an earthquake is sensed. In other words, the management device 2 is able to cancel an inappropriate alert state in a communication device 1.

Example 2

The configuration of a network system in Example 2 is similar to FIG. 1. In other words, the ad hoc network system includes a management server S, a sync node SN, and nodes Na to Nh. Also, similarly to Example 1, the nodes Na to Nh are examples of a communication device, and at least one of the management server S and the sync node SN are examples of a management device.

Figure 9:
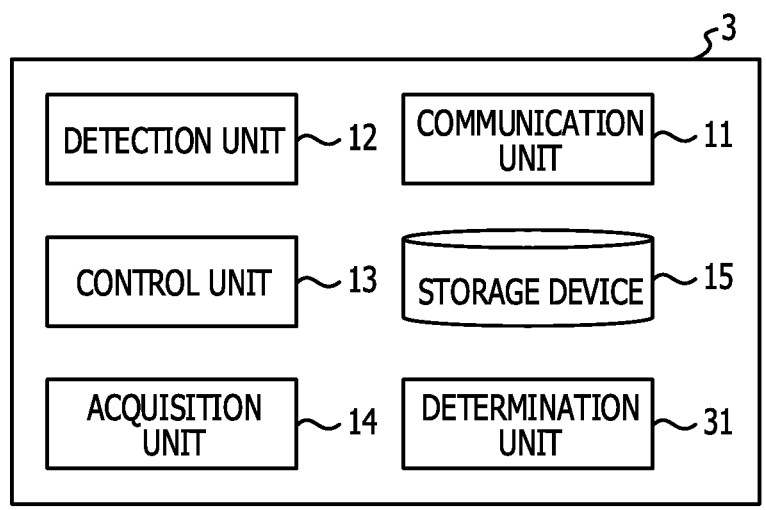
FIG. 9 is a function block diagram of a communication device in Example 2.

A functional configuration of a communication device in Example 2 will be described. FIG. 9 is a function block diagram of a communication device in Example 2. The communication device 3 includes a communication unit 11, a detection unit 12, a control unit 13, an acquisition unit 14, a storage device 15, and a determination unit 31. Note that in FIG. 9, processing units that conduct processes similar to Example 1 are denoted with the same signs.

However, in Example 2, the control unit 13 does not cancel an alert state based on a control command from a management device 2, but rather cancels the alert state based on a determination result of the determination unit 31. Also, the communication unit 11 receives from another communication device a transition notification generated by another communication device, and transmits a transition notification generated by the current communication device itself to another communication device. Note that the transition notification is a notification indicating that vibration was detected in another communication device. Note that the data structure of a transition notification is similar to Example 1.

The determination unit 31 determines whether or not sensed vibration is vibration caused by an earthquake. For example, the determination unit 31 determines whether or not sensed vibration is an earthquake based on the number of transition notifications received from other communication devices. If a number of transition notifications equal to or greater than a threshold value are received, the sensed vibration is determined to be vibration caused by an earthquake.

Subsequently, in the case of determining that the sensed vibration is vibration caused by an earthquake, the determination unit 31 reports the determination result to the control unit 13. The control unit 13, in response to the report of the determination result, cancels the alert state.

Figure 10:
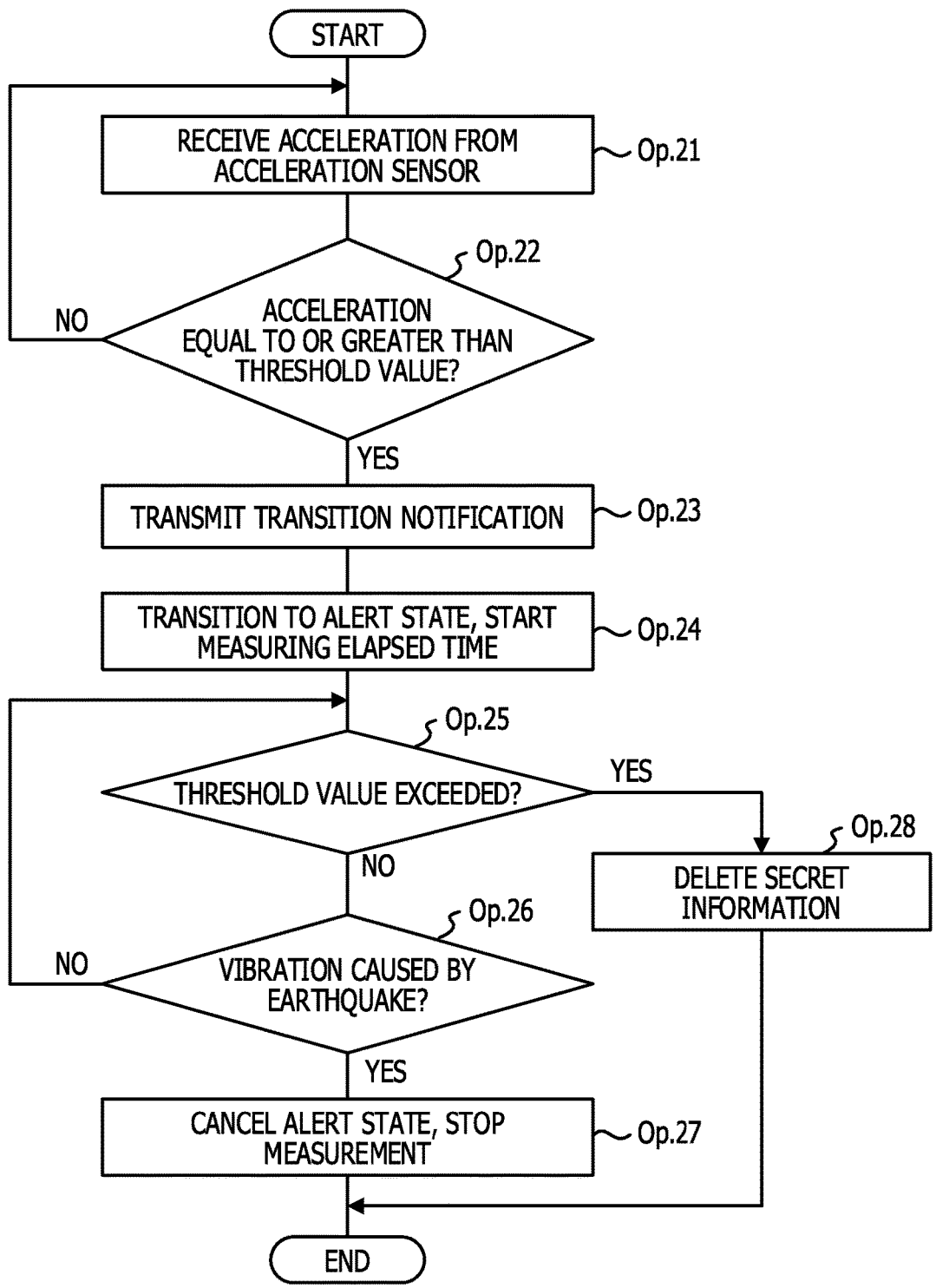
FIG. 10 is a flowchart of a process executed by the communication device 3 in Example 2.

A process flow of a communication device in Example 2 will be described. FIG. 10 is a flowchart of a process executed by the communication device 3 in Example 2.

From an acceleration sensor, the detection unit 12 receives an acceleration detected by the acceleration sensor (Op. 21). The detection unit 12 determines whether or not the received acceleration is equal to or greater than a threshold value (Op. 22). If the acceleration is equal to or greater than the threshold value (Op. 22, Yes), the communication device 3 advances the process to Op. 23. On the other hand, if the acceleration is less than the threshold value (Op. 22, No), the communication device 3 returns to Op. 21.

The control unit 13 broadcasts a transition notification to other nearby communication devices (Op. 23). Subsequently, the control unit 13 transitions from an ordinary state to an alert state (Op. 24). In the present working example, transitioning to the alert state means starting to measure the elapsed time. The control unit 13 determines whether or not the elapsed time has exceeded a threshold value (Op. 25).

If the elapsed time exceeds the threshold value (Op. 25, Yes), the control unit 13 deletes at least some of the secret information being stored in the storage device (Op. 28). If the elapsed time has not exceeded the threshold value (Op. 25, No), the determination unit 31 determines whether or not the sensed vibration is vibration caused by an earthquake (Op. 26).

If an earthquake occurs in the area where the network including the group of communication devices 3 is formed, the process from Op. 21 to Op. 23 is executed in each communication device. In other words, each communication device broadcasts a transition notification. Consequently, the communication device 3 receives transition notifications broadcast from other communication devices.

In other words, if vibration is sensed in another communication device, in addition to the process of FIG. 10, the communication unit 11 of the communication device 3 executes a process of receiving a transition notification every time a transition notification is broadcast from another communication device. Note that the other communication device is one or more communication devices existing within communicable range of the current device. In addition, the determination unit 31 counts the number of received transition notifications.

In Op. 26 of FIG. 10, the determination unit 31 determines whether or not the number of received transition notifications is equal to or greater than a threshold value. If a number of transition notifications equal to or greater than the threshold value have been received, the vibration sensed in Op. 22 is determined to be vibration caused by an earthquake. On the other hand, if the number of received transition notifications is less than the threshold value, the vibration sensed in Op. 22 is determined to not be vibration caused by an earthquake.

The configuration of a threshold value will be described. First, since each communication device periodically communicates with other communication devices for the purpose of routing, ordinarily each communication device knows the conditions of communication with the other communication devices. Consequently, in Op. 26, the communication device may know the number of other communication devices with which the communication device has exchanged packets in order to construct forwarding routes for the last 10 minutes. Accordingly, a value that corresponds to, for example, 80% of the number of other communication devices that may be communicated with may be adopted as the threshold value. Note that the construction of forwarding routes is conducted according to existing techniques.

If the determination unit 31 determines that the vibration detected by the detection unit 12 is vibration caused by an earthquake (Op. 26, Yes), the control unit 13 cancels the alert state (Op. 27). In the present working example, cancelling the alert state means stopping the measurement of the elapsed time. For example, the control unit 13 stops the count of the timer. Subsequently, the communication device 3 ends the series of processes.

On the other hand, if the determination unit 31 determines that the sensed vibration is not vibration caused by an earthquake (Op. 26, No), the control unit 13 returns the process to Op. 25 (Op. 27).

Note that, similarly to Example 1, in the case in which the alert state is a state of heightened security against accessing secret information, the control unit 13 maintains the alert state until a control command is received. Subsequently, if the determination unit 31 determines that the sensed vibration is vibration caused by an earthquake, the control unit 13 cancels the alert state. Alternatively, the state of heightened security against accessing secret information may be maintained for a designated amount of time, and afterwards, the secret information may be deleted.

According to the above process, each communication device is able to cancel an alert state as appropriate. In other words, each communication device is able to sense the occurrence of an earthquake and cancel the alert state without communicating with a management device. If the management device 2 is the management server S in FIG. 1, the sync node SN and the management server S are connected by an ordinary network. When an earthquake occurs, there is a possibility that some kind of failure may occur on this network. Accordingly, each communication device is able to sense the occurrence of an earthquake using only communication within the ad hoc network 100. In addition, each communication device is able to cancel an inappropriate alert state.

Example 3

Figure 11:
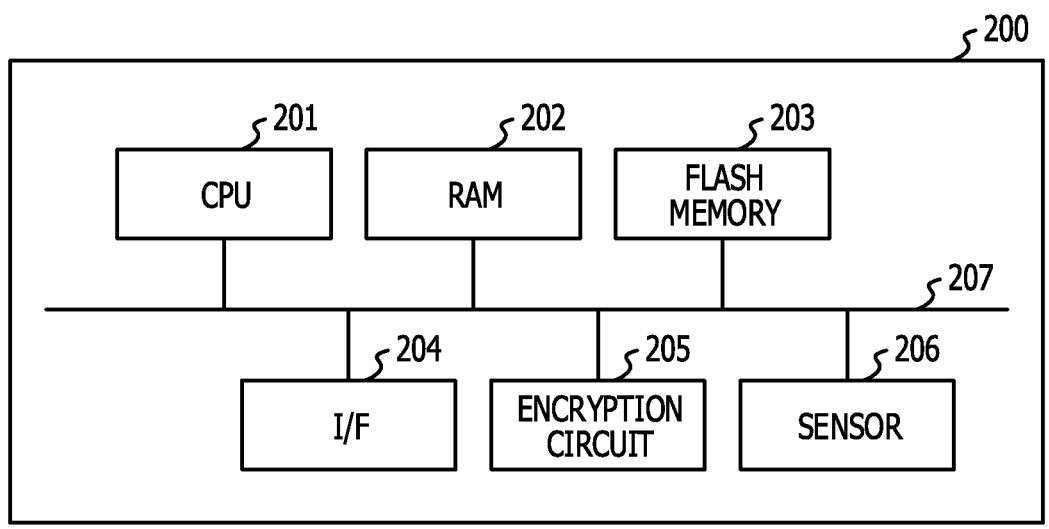
FIG. 11 is an exemplary hardware configuration of the communication device 1 and the communication device 3.

FIG. 11 is an exemplary hardware configuration of the communication device 1 and the communication device 3. Note that the node 200 in FIG. 11 functions as the communication device 1 or the communication device 3. The node 200 is equipped with a central processing unit (CPU) 201, random access memory (RAM) 202, flash memory 203, an interface (I/F) 204, an encryption circuit 205, a sensor 206, and a bus 207. The CPU 201 to the sensor 206 are respectively connected by the bus 207.

The CPU 201 administers overall control of the communication device. The CPU 201 executes a program loaded into the RAM 202, and thereby functions as the communication unit 11, the detection unit 12, the control unit 13, the acquisition unit 14, the determination unit 31, and the like.

The RAM 202 is used as a work area of the CPU 201. The flash memory 203 stores programs, information detected by the sensor, and key information such as an encryption key. Note that the flash memory 203 is an example of the storage device 15. The I/F 204 transmits and receives packets by multi-hop communication. The programs may include programs for causing the communication device to execute each process illustrated in the flowcharts, for example.

The encryption circuit 205 is a circuit that encrypts data with an encryption key in the case of encrypting data. For example, the encryption circuit 205 functions in the case of encrypting packets for forwarding. In the case of executing encryption in software, the encryption circuit 205 may be omitted by storing a program corresponding to the encryption circuit 205 in the flash memory 203. The sensor 206 detects data characteristic to the sensor 206. For example, the sensor 206 detects data from a subject of measurement, such as temperature, humidity, altitude, precipitation, air flow, volume of sound, power usage, an amount of time, the clock time, or acceleration.

Note that although FIG. 11 illustrates an example in which the communication device 1 is the node 200 constituting the ad hoc network, the communication device 1 or 3 may also be a general-purpose computer. In other words, the communication device 1 or 3 may also be a computer that includes a central processing unit (CPU), read-only memory (ROM), random access memory (RAM), a communication device, a hard disk drive (HDD), an input device, a display device, a medium reading device, and the like. Note that the respective components are connected to each other via a bus.

For example, in the case of managing multiple personal computers (PCs) in an organization, a management server of the organization functions as the management device, while each of the multiple PCs functions as a communication device. Each PC includes an acceleration sensor, and senses the occurrence of vibration based on the output of the acceleration sensor. Subsequently, each PC transitions to an alert state.

If the management server determines that the sensed vibration is vibration caused by an earthquake, the PCs cancel the alert state based on a control command. On the other hand, if a PC determines by communication with other PCs that the sensed vibration is vibration caused by an earthquake, the PC cancels the alert state.

Consequently, at the time of sensing a likelihood of theft, each PC is able to autonomously transition to an alert state that deters information leakage from that PC. Furthermore, each PC is able to avoid the inappropriate continuation of an alert state, and cancel the alert state.

Figure 12:
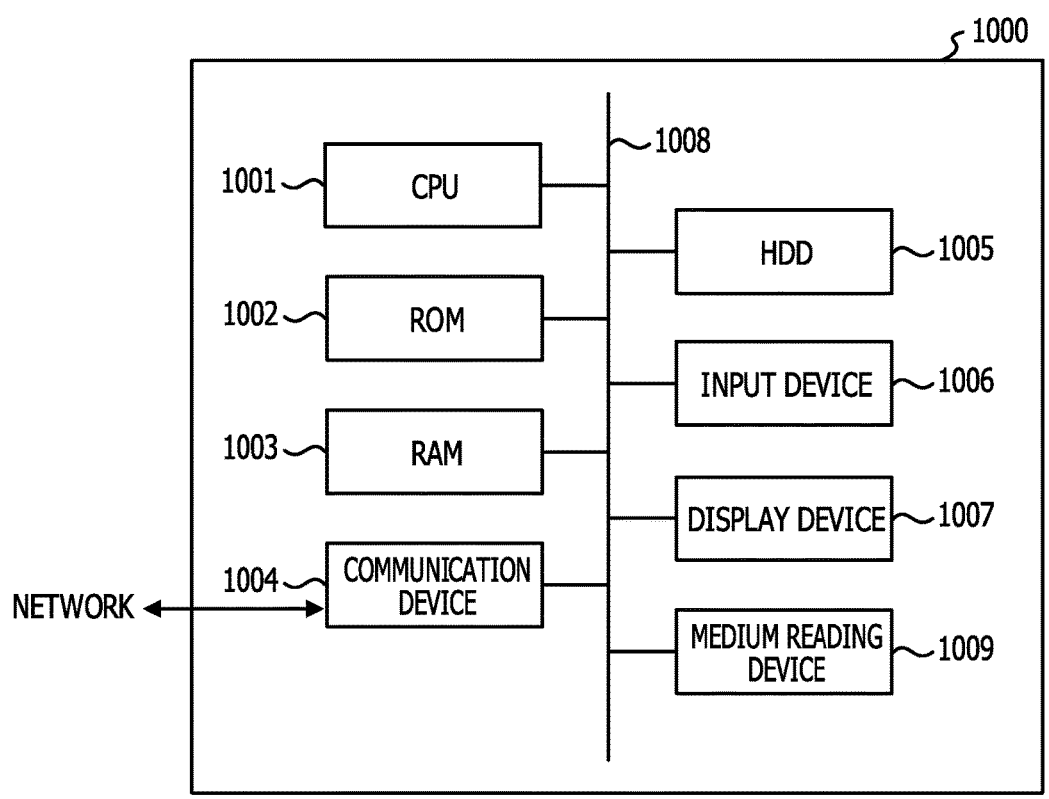
FIG. 12 is an exemplary hardware configuration of the management device 2.

FIG. 12 is an exemplary hardware configuration of the management device 2. A computer 1000 functions as the management device 2. The computer 1000 includes a central processing unit (CPU) 1001, read-only memory (ROM) 1002, random access memory (RAM) 1003, a communication device 1004, a hard disk drive (HDD) 1005, an input device 1006, a display device 1007, and a medium reading device 1009. The respective components are connected to each other via a bus 1008, and are also able to exchange data with each other under the supervision of the CPU 1001. Note that in some cases, the management device 2 may not include all components illustrated in FIG. 12.

A management program for causing the management device to execute the respective processes illustrated in the flowcharts is recorded on a computer-readable recording medium. The computer-readable recording medium may be a magnetic recording device, an optical disc, a magneto-optical recording medium, semiconductor memory, or the like. The magnetic recording device may be an HDD, a flexible disk (FD), magnetic tape (MT), or the like.

The optical disc may be a Digital Versatile Disc (DVD), DVD-RAM, Compact Disc-Read-Only Memory (CD-ROM), CD-Recordable/Rewritable (CD-R/RW), or the like. The magneto-optical recording medium may be a magneto-optical (MO) disc or the like. In the case of distributing the program, selling a portable recording medium such as a DVD or CD-ROM having the program recorded thereon, for example, is conceivable.

In the computer 1000, the medium reading device 1009 then retrieves the program from a recording medium having the program recorded thereon, for example. The CPU 1001 stores the retrieved program in the HDD 1005, the ROM 1002, or the RAM 1003.

The CPU 1001 is a central processing device that administers overall operating control of the management device. The communication device 1004 receives a signal from a communication device, sync node, or the like via a network, and passes the content of the signal to the CPU 1001. Additionally, the communication device 1004 transmits a signal to a communication device or the like according to an instruction from the CPU 1001.

The HDD 1005 stores a program causing a computer to execute the respective processes illustrated in the flowcharts.

Subsequently, the CPU 1001 retrieves and executes the program from the HDD 1005, and thereby functions as the communication unit 21 and the generation unit 22 illustrated in FIG. 3. Also, the program may be stored in the ROM 1002 or the RAM 1003 accessible by the CPU 1001.

Additionally, information is stored in the HDD 1005 under the supervision of the CPU 1001. Similarly to the program, the information may also be stored in the ROM 1002 or the RAM 1003 accessible by the CPU 1001. In other words, data tables of a storage unit are stored in a storage device such as the HDD 1005, the ROM 1002, or the RAM 1003. Also, the input device 1006 receives the input of data under the supervision of the CPU 1001. The display device 1007 outputs respective information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication device comprising:
   a memory; and
   a processor coupled to the memory which are installed in a power meter and configured to:
      when a first vibration is detected in the communication device indicating a likelihood of theft, set the communication device to an alert state, the alert state including engaging a countermeasure to protect designated information stored in the memory, and
      measure an amount of time elapsed after the first vibration is detected until either a threshold is exceeded or a control command is received,
   wherein when the measured amount of time exceeds the threshold, the designated information is deleted,
   wherein when a control command is received from another communication device, installed in a second power meter, providing a notification that the another communication device detected a second vibration and when the measured amount of time from after the first vibration is detected until the control command is received is less than the threshold, the alert state is cancelled, and the designated information is not deleted;
   wherein the first vibration is determined to have been caused by an earthquake when the notification and a number of times of receiving additional notifications from additional communication devices in power meters detecting additional vibrations is equal to or greater than a second threshold value.

2. The communication device according to claim 1, wherein the first vibration is detected when an output value from a sensor exceeds a third threshold value, the sensor being installed in the communication device.

3. A system comprising:
   a plurality of communication devices installed in power meters included in a communication network; and
   a management device that manages the plurality of communication devices, wherein the management device includes a first processor configured to:
      when an occurrence of an earthquake is detected, generate a control command that controls a state of certain communication devices from among the plurality of communication devices, the certain communication devices being in an area where the earthquake occurred, and
      output the control command to the certain communication devices, and
   wherein the plurality of communication devices respectively include a memory and a second processor configured to:
      when a first vibration indicating a likelihood of theft is detected in a first communication device of the plurality of communication devices, set the first communication device to an alert state, the alert state including engaging a countermeasure to protect designated information stored in the memory, and
      measure an amount of time elapsed after the first vibration is detected until either a threshold is exceeded or a control command is received,
      wherein when the measured amount of time exceeds the threshold, the designated information is deleted, and
      wherein when the measured amount of time from after the first vibration is detected until the control command is received is less than the threshold, the alert state is cancelled, and the designated information is not deleted; and
   wherein the first processor is further configured to:
      receive, from at least one of the plurality of communication devices, the control command providing a notification indicating that a second vibration has been sensed, and
      determine that the earthquake has occurred when the notification and a number of times of receiving additional notifications from additional communication devices from the plurality of communication devices detecting additional vibrations is equal to or greater than a second threshold value.

4. The control method according to claim 3, wherein the first vibration is detected when an output value from a sensor exceeds a third threshold value, the sensor being installed in the first communication device.

\* \* \* \* \*